(12) United States Patent  (10) Patent No.: US 7,831,257 B2
Pollman et al.  (45) Date of Patent: Nov. 9, 2010

(54) MEASURING INTERFERENCE IN RADIO NETWORKS

(75) Inventors: Michael D. Pollman, Londonderry, NH (US); Satish Ananthaiyer, Tewksbury, MA (US); Theodore O. Grosch, Bolton, MA (US)

(73) Assignee: Airvana, Inc., Chelmsford, MA (US)

( * ) Notice: Subject to any disclaimer, the term of this patent is extended or adjusted under 35 U.S.C. 154(b) by 599 days.

(21) Appl. No.: 11/114,422

(22) Filed: Apr. 26, 2005

(65) Prior Publication Data

US 2006/0240782 A1    Oct. 26, 2006

(51) Int. Cl.
    *H04W 72/00*    (2009.01)
(52) U.S. Cl. ............... 455/453; 455/513; 455/67.7; 455/509; 455/464; 370/342; 370/335
(58) Field of Classification Search ........... 455/453, 455/513, 67.7, 509, 464, 403, 422.1, 456.1, 455/420; 370/342, 335
    See application file for complete search history.

(56) References Cited

U.S. PATENT DOCUMENTS

| | | | |
|---|---|---|---|
| 4,031,469 A * | 6/1977 | Johnson | 455/226.4 |
| 4,072,900 A * | 2/1978 | Ray | 455/67.7 |
| 5,631,604 A * | 5/1997 | Dent et al. | 330/124 R |
| 5,828,677 A | 10/1998 | Sayeed et al. | |
| 5,842,140 A * | 11/1998 | Dent et al. | 455/573 |
| 5,857,147 A | 1/1999 | Gardner et al. | |
| 5,884,187 A | 3/1999 | Ziv et al. | |
| 5,923,650 A | 7/1999 | Chen et al. | |
| 5,982,760 A | 11/1999 | Chen | |
| 6,226,525 B1 | 5/2001 | Boch et al. | |
| 6,507,744 B1 | 1/2003 | Han et al. | |
| 6,567,420 B1 | 5/2003 | Tiedemann, Jr. et al. | |
| 6,633,652 B1 | 10/2003 | Donescu | |
| 6,697,378 B1 | 2/2004 | Patel | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,904,286 B1 | 6/2005 | Dantu | |
| 6,965,564 B2 | 11/2005 | Coffman | |
| 6,983,153 B2 * | 1/2006 | Jain et al. | 455/453 |
| 6,983,333 B2 | 1/2006 | Haberland | |
| 6,999,425 B2 | 2/2006 | Cheng et al. | |
| 7,016,686 B2 | 3/2006 | Spaling et al. | |

(Continued)

OTHER PUBLICATIONS

U.S. Appl. No. 10/835,546, filed on Apr. 28, 2004, including application as filed, transaction history from PAIR (PTO Website), and pending claims.

(Continued)

*Primary Examiner*—Minh D Dao
(74) *Attorney, Agent, or Firm*—Fish & Richardson P.C.

(57) ABSTRACT

In a radio access network (e.g., a cellular network), a radio receiver is configured with a switch that alternatively couples an antenna and an impedance-matched load to the remainder of the receiver. Sector load, e.g., rise-over-thermal (ROT), is monitored by comparing a first measurement of signal power in a radio receiver (e.g., signal power output by the receiver) when the radio receiver is coupled to an antenna receiving the data traffic with a second measurement of signal power in the radio receiver when the radio receiver is de-coupled from the antenna.

31 Claims, 7 Drawing Sheets

U.S. PATENT DOCUMENTS

| | | | |
|---|---|---|---|
| 7,031,141 B2 | 4/2006 | Kuriyama | |
| 7,082,317 B2 | 7/2006 | Yano et al. | |
| 7,085,570 B2 | 8/2006 | Tigerstedt et al. | |
| 7,120,134 B2* | 10/2006 | Tiedemann et al. | 370/329 |
| 7,120,447 B1* | 10/2006 | Chheda et al. | 455/453 |
| 7,136,353 B2 | 11/2006 | Ha et al. | |
| 7,136,666 B2 | 11/2006 | Charriere et al. | |
| 7,142,548 B2* | 11/2006 | Fong et al. | 370/395.4 |
| 7,170,871 B2 | 1/2007 | Eyuboglu et al. | |
| 7,200,391 B2 | 4/2007 | Chung et al. | |
| 7,206,291 B2 | 4/2007 | Soldani et al. | |
| 7,242,958 B2 | 7/2007 | Chung et al. | |
| 7,248,875 B2 | 7/2007 | Schreuder et al. | |
| 7,248,889 B2 | 7/2007 | Schwarz et al. | |
| 7,268,674 B2* | 9/2007 | Bohler et al. | 340/426.25 |
| 7,277,446 B1 | 10/2007 | Abi-Nassif et al. | |
| 7,299,278 B2 | 11/2007 | Ch'ng | |
| 7,305,241 B2 | 12/2007 | Hirvonen et al. | |
| 7,366,230 B2 | 4/2008 | Jonsson | |
| 7,466,669 B2 | 12/2008 | Hosein | |
| 2002/0021687 A1* | 2/2002 | Toki et al. | 370/345 |
| 2002/0072385 A1 | 6/2002 | Salvarani et al. | |
| 2002/0111183 A1 | 8/2002 | Lundby | |
| 2002/0191567 A1 | 12/2002 | Famolari et al. | |
| 2002/0193118 A1* | 12/2002 | Jain et al. | 455/453 |
| 2002/0196749 A1 | 12/2002 | Eyuboglu et al. | |
| 2003/0072294 A1 | 4/2003 | Wei et al. | |
| 2003/0083092 A1 | 5/2003 | Kim et al. | |
| 2003/0092463 A1 | 5/2003 | Charriere et al. | |
| 2003/0100311 A1 | 5/2003 | Chung et al. | |
| 2004/0038697 A1 | 2/2004 | Attar et al. | |
| 2004/0047305 A1 | 3/2004 | Ulupinar | |
| 2004/0109424 A1 | 6/2004 | Chheda | |
| 2004/0110534 A1* | 6/2004 | Chung et al. | 455/561 |
| 2004/0179494 A1 | 9/2004 | Attar et al. | |
| 2004/0179525 A1 | 9/2004 | Balasubramanian et al. | |
| 2004/0185868 A1* | 9/2004 | Jain et al. | 455/453 |
| 2004/0202136 A1 | 10/2004 | Attar et al. | |
| 2004/0213182 A1 | 10/2004 | Huh et al. | |
| 2004/0229604 A1* | 11/2004 | Fong et al. | 455/422.1 |
| 2005/0047375 A1* | 3/2005 | Kwon et al. | 370/335 |
| 2005/0107090 A1* | 5/2005 | Hosein | 455/453 |
| 2005/0107091 A1* | 5/2005 | Vannithamby et al. | 455/453 |
| 2005/0124369 A1* | 6/2005 | Attar et al. | 455/522 |
| 2005/0169301 A1 | 8/2005 | Jain et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0250511 A1* | 11/2005 | Xiao et al. | 455/453 |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0135173 A1* | 6/2006 | Vannithamby | 455/453 |
| 2006/0135189 A1* | 6/2006 | Nagaraj et al. | 455/513 |
| 2006/0159045 A1 | 7/2006 | Ananthaiyer et al. | |
| 2006/0176187 A1* | 8/2006 | Bohler et al. | 340/815.45 |
| 2006/0215608 A1* | 9/2006 | Lee et al. | 370/331 |
| 2006/0240782 A1 | 10/2006 | Pollman et al. | |
| 2006/0252429 A1 | 11/2006 | Chen et al. | |
| 2006/0268798 A1 | 11/2006 | Kim et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0101015 A1 | 5/2007 | Larsson et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0202826 A1* | 8/2007 | Dean | 455/230 |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248035 A1* | 10/2007 | Sang et al. | 370/318 |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng | |
| 2008/0254792 A1 | 10/2008 | Ch'ng | |
| 2009/0034440 A1 | 2/2009 | Samar et al. | |
| 2009/0170547 A1 | 7/2009 | Raghothaman et al. | |

OTHER PUBLICATIONS

U.S. Appl. No. 10/835,537, filed on Apr. 28, 2004, including application as filed, transaction history from PAIR (PTO Website), and pending claims.

U.S. Appl. No. 11/037,515, filed on Jan. 18, 2005, including application as filed, transaction history from PAIR (PTO website), and pending claims.

U.S. Appl. No. 11/191,528, filed on Jul. 28, 2005, including application as filed, transaction history from PAIR (PTO website), and pending claims.

U.S. Appl. No. 11/965,070, filed on Dec. 27, 2007, including application as filed, transaction history from PAIR (PTO website), and pending claims.

3rd Generation Partnership Project "3GPP2", CDMA 2000 High Rate Packet Data Air Interface Specification, C.S0024-A, version 4.0, Oct. 25, 2002.

3rd Generation Partnership Project "3GPP2", CDMA 2000 High Rate Packet Data Air Interface Specification, C.S0024-A, version 1.0, Mar. 2004.

3rd Generation Partnership Project "3GPP2", CDMA2000 High Rate Packet Data Interface Specification, TIA/EIA/IS-856A, C.S0024-A, Version 2, Jul. 2005 (1227 pages).

3rd Generation Partnership Project "3GPP2", CDMA2000 High Rate Packet Data Interface Specification, TIA/EIA/IS-856B, C.S0024-B, Version 1, Apr. 2006 (1623 pages).

3rd Generation Partnership Project "3GPP2", CDMA2000 High Rate Packet Data Interface Specification, TIA/EIA/IS-856B, C.S0024-B, Version 2, Mar. 2007 (1627 pages).

Base Transceiver Station that Connects Mobile Phones to the Public Network, System Applications; Backbone Communications; Base Transceiver Stations (Mobile Telephony), NEC Electronics, Jun. 3, 2005, pp. 1-4, http://necel.com/en/solutions/applications/bs/bs.html.

Charkravarth, S., "Algorithm for Reverse Traffic Rate Control for cdma2000 High Rate Packet Data Systems", GLOBECOM2001, San Antonion, Texas, Nov. 2001 (pp. 3733-3737).

3rd Generation Partnership Project "3GPP2", "TSG-C WG3, 1xEV-DO, Evaluation Methodology", 3GPP2 TSG-C Contribution C30-20031002-004, Oct. 2004 (194 pages).

Attar, Rashid A. and Eduardo Esteves, "A Reverse Link Outer-Loop Power Control Algorithm for CDMA2000 1xEV Systems", Proceedings of ICC, Apr. 2002.

Garg, Vijay K., "IS-95 CDMA and cdma 2000 Cellular/PCS Systems Implementation", Communication Engineering and emerging Technologies, Series Editor, Theodore S. Rappaport, Chapter 10, Prentice Hall, 1999.

Steele, Raymond and Lajos Hanzo, "Mobile Radio Communications", Second Edition, Second Edition, Second and Third Generation Cellular and WATM Systems, Pentech Press Limited, London, England, 1992.

Office Action and response history as of Feb. 23, 2009 in U.S. Appl. No. 10/835,546.

Office Action and response history as of Feb. 12, 2009 in U.S. Appl. No. 10/835,537.

Office Action and response history as of Feb. 23, 2009 in U.S. Appl. No. 11/037,515.

Office Action and response history as of Feb. 23, 2009 in U.S. Appl. No. 11/191,528.

Office Action and response history as of Apr. 8, 2009 in U.S. Appl. No. 10/835,537.

Office Action and response history as of Apr. 8, 2009 in U.S. Appl. No. 11/191,528.

Office action from U.S. Appl. No. 11/037,515 mailed Jun. 15, 2009.

Advisory action mailed Jun. 2, 2009 and request for continued examination filed Jul. 21, 2009 from U.S. Appl. No. 10/835,546.

Office Action and response history as of Sep. 24, 2009 in U.S. Appl. No. 11/037,515.

Office Action and response history as of Sep. 24, 2009 in U.S. Appl. No. 10/835,546.

Office Action and response history as of Oct. 14, 2009 in U.S. Appl. No. 10/835,537.

Office Action and response history as of Oct. 14, 2009 in U.S. Appl. No. 11/191,528.

* cited by examiner

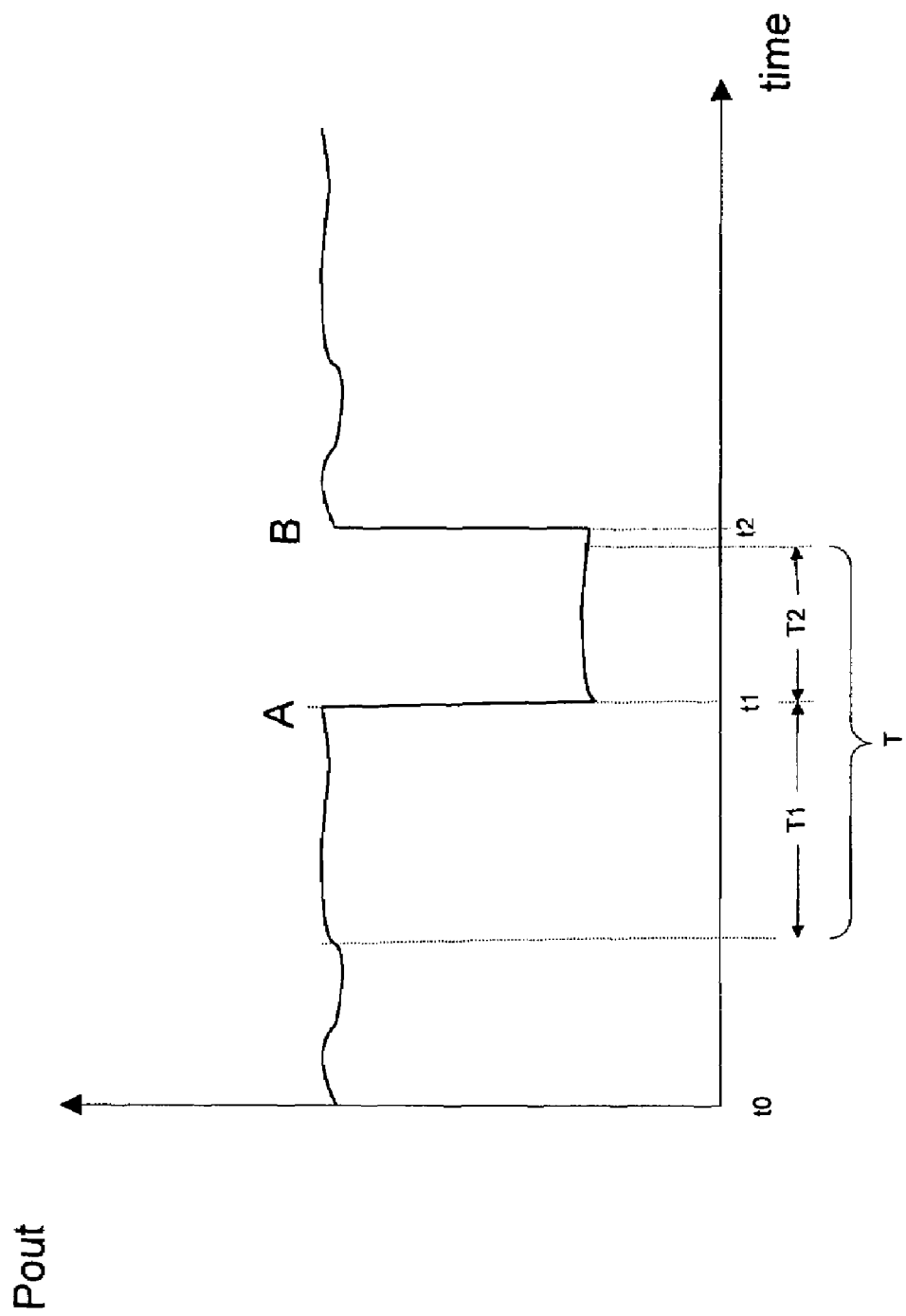

MEASURING INTERFERENCE IN RADIO NETWORKS

TECHNICAL FIELD

This disclosure relates to the measurement of radio frequency interference in wireless communication systems.

BACKGROUND

Cellular wireless communications systems are designed to serve many mobile stations distributed in a large geographic area by dividing the area into cells. At the center of each cell, a radio node is located to serve access terminals (e.g., cellular telephones) located in the cell. Each cell is often further divided into sectors by using multiple sectorized antennas (the term "sector" is used both conventionally and in this document, however, even when there is only one sector per cell). In each cell, a radio node serves one or more sectors and communicates with multiple mobile stations in its cell. A radio node can generally support a certain amount of traffic in each sector for a particular bandwidth and it is often desirable to monitor the level of traffic in a sector in order to ensure that the sector is not becoming overloaded.

SUMMARY

In one aspect, the invention features a device for determining a rise-over thermal value for a receiver that receives data traffic from sources in a sector of a cellular network (e.g., a 1xEV-DO network) based on a relationship of signal power in the receiver when the receiver is receiving energy from an antenna (e.g., when the receiver is receiving normal data traffic or is receiving interference power when data traffic is quiet in the sector) and signal power in the receiver when the receiver is not receiving energy from the antenna (e.g., when the receiver is de-coupled from the antenna).

In another aspect, the invention features a method that includes determining a first measurement of signal power in a radio receiver configured to receive data traffic in a sector of a radio access network when the radio receiver is receiving energy from an antenna that is receiving the data traffic and determining a second measurement of signal power in the radio receiver when the radio receiver is not receiving energy from the antenna. Load in the sector is then determined based on the first and second measurements.

Embodiments include one or more of the following features. The first and/or second measurements of signal power in the radio receiver may be a measurement of signal power output by the radio receiver, signal power at the input of the radio receiver, or signal power at some other point within the receiver. The first and/or second measurements of signal power may be an average of signal power in the receiver over time.

Sector load may be determined based on comparing the first and second measurements, such as by taking the ratio of the first measurement to the second measurement.

To prevent the receiver from receiving energy from the antenna (e.g., to take the second measurement), the antenna may be de-coupled from the remainder of the radio receiver using a switch. The switch may be used to couple a resistive load having an impedance approximately equal to that of the antenna to the remainder of the receiver when the second measurement is obtained.

The method may also include controlling transmission (e.g., a transmit rate and/or power) of data by access terminals in the sector based on the determined load in the sector.

The method may also including causing access terminals within the sector to cease transmission for a time period. The second measurement of signal power can occur when the radio receiver is not receiving energy from the antenna and when the access terminals within the sector have ceased transmission. In addition, a third measurement of signal power in the radio receiver may be obtained when the radio receiver is receiving energy from the antenna and when the access terminals within the sector have ceased transmission. A level of interference within the sector may then be determined based on at least the second and third measurements, and a level of signal power from access terminals in the sector may be determined based on at least the first and third measurements.

In some implementations, the receiver may include variable gain circuitry for dynamically adjusting a gain of the receiver and the method may include maintaining a gain of the variable gain circuitry approximately constant during a time when the second measurement is determined. For example, a switch may be controlled to keep a time period during which the antenna is de-coupled from the receiver at less than a response time of the variable gain circuitry. Alternatively, a gain from the variable gain circuitry may be stored and maintained during a period when the second measurement is obtained. The method may also include deriving the first measurement from a measurement of signal power output at the receiver and a measurement of a gain of the receiver.

In another aspect, the invention features a method of monitoring load in a sector of a radio access network comprising a radio node having multiple receivers for receiving data traffic in a sector that includes de-coupling the first receiver from an antenna configured to receive data traffic and maintaining at least one other receiver coupled to an antenna while the first receiver is de-coupled from its antenna. A measurement of signal power in the first receiver may be determined when the first receiver is de-coupled from its antenna.

Embodiments may include one or more of the following features. The method may also include ensuring that only one receiver is de-coupled from its antenna at any one time. It may also include determining a measurement of signal power in a receiver (e.g., the first receiver or a different receiver) when the receiver is coupled to an antenna. Load in the sector may be determined based on a measurement of signal power when the first receiver is de-coupled from the antenna and a measurement of signal power when a receiver is coupled to an antenna. The measurements of signal power may be taken at the output of the receiver, the input of the receiver, or at some other point in the receiver. The measurements may also reflect an average of signal power received over a particular time period.

The method may also include controlling a switch to de-couple the first receiver comprises coupling the first receiver to a load having an impedance approximately equal to that of the antenna.

In some implementations, the first receiver includes variable gain circuitry for dynamically adjusting a gain of the first receiver, and the method may include controlling the switch to keep a time period during which the antenna is de-coupled from the first receiver at less than a response time of the variable gain circuitry. Alternatively, the method may include storing and maintaining a gain of the variable gain circuitry approximately constant during a time when the measurement is determined.

In another aspect, the invention features an apparatus that includes a radio receiver for receiving data traffic from sources in a sector of a cellular network, a switch for selectively coupling and de-coupling an antenna of the receiver from the remainder of the radio receiver, and a rise-overthermal measurement module. The rise-over-thermal measurement module may be configured to control the switch to determine a rise-over-thermal value for the receiver based on a ratio of signal power in the receiver when the switch is coupled to the antenna to signal power in the receiver when the switch is de-coupled from the antenna.

Embodiments may include one or more of the following features. The apparatus may also include variable gain circuitry for dynamically adjusting a gain of the signal output by the receiver. The rise-over-thermal measurement module may be configured to control the switch such that the a time period during which the antenna is de-coupled from the first receiver is less than a response time of the variable gain circuitry. Alternatively, the rise-over-thermal measurement module may be configured to maintain a gain of the variable gain circuitry approximately constant during a time when the measurement is determined.

The apparatus may also include additional radio receivers (e.g., diversity receivers) for receiving data traffic from sources in the sector of a cellular network. Each receiver may include a switch for coupling and de-coupling an antenna with the remainder of the receiver. The rise-over-thermal measurement module may be configured to maintain at least one receiver coupled to its antenna while any other receiver is de-coupled from its antenna.

DESCRIPTION OF DRAWINGS

FIG. 4B is a graph charting Pout versus time.

DETAILED DESCRIPTION

Figure 1:
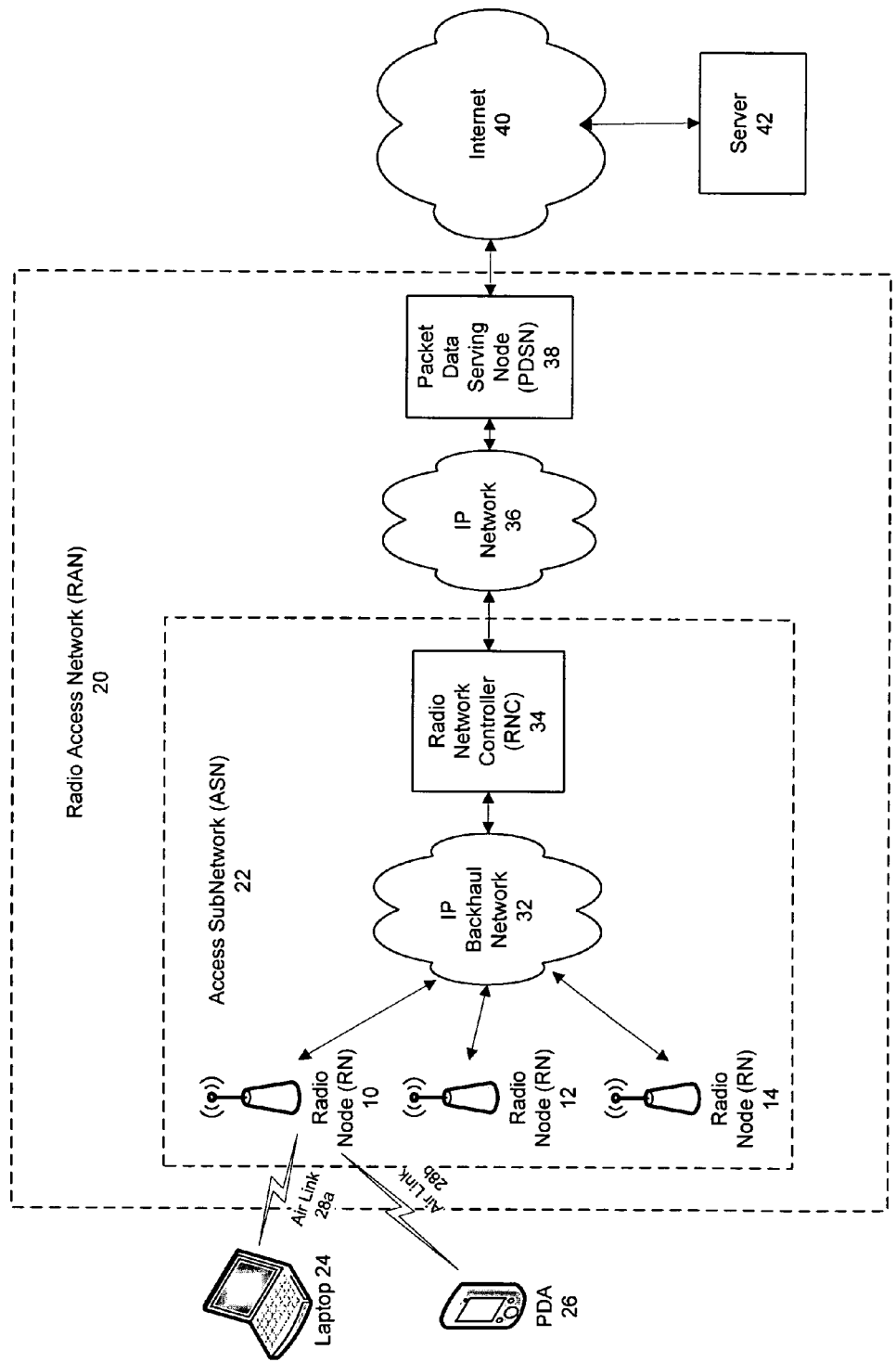
FIG. 1 is a diagram of a radio access network.

Referring to FIG. 1, a radio access network (RAN) 20 uses the first evolution data-only (1x EV-DO) protocol to transmit data packets between an access terminal (AT), such as laptop 24 and personal data assistant (PDA) 26, and an external network such as the Internet 40. The 1xEV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 1.0, March 2004, Ballot Resolution, but has yet not been adopted. Revision A is also incorporated herein by reference.

The radio access network 20, which may cover a large service area, includes one or more Access Sub-Networks (ASN's), e.g., ASN 22, each anchored by a Radio Network Controller (RNC) 34 communicating with several Radio Nodes (RN's) 10, 12, 14 using a private or public IP backhaul network 32. Each RN may support multiple sectors, such as the three sectors shown in FIG. 1, with each sector covering a certain cell area around the RN.

ASN 22 is connected over a public or private IP network 36 to one or more Packet Data Serving Node's (PDSN's), e.g., PDSN 38. The PDSN, in turn, receives and transmits data packets (e.g., voice over IP packets) to a server 42 via the Internet 40. In some implementations, the functions of a PDSN and an RNC are combined into a single device.

Each AT is in communication with a radio node, e.g., RN 10, via an air link 28a, 28b. An air link comprises a forward link, which carries data transmitted from an RN to an AT, and a reverse link, which carries data transmitted from the AT to the RN. As an AT moves from one sector to another sector serviced by the same RN, it undergoes a "softer handoff" between the sectors. Similarly, when an AT moves from one sector to another sector serviced by different RNs, it undergoes a "soft handoff" between the RNs. When an AT is in soft or softer handoff, it will have connections in multiple sectors.

Figure 2:
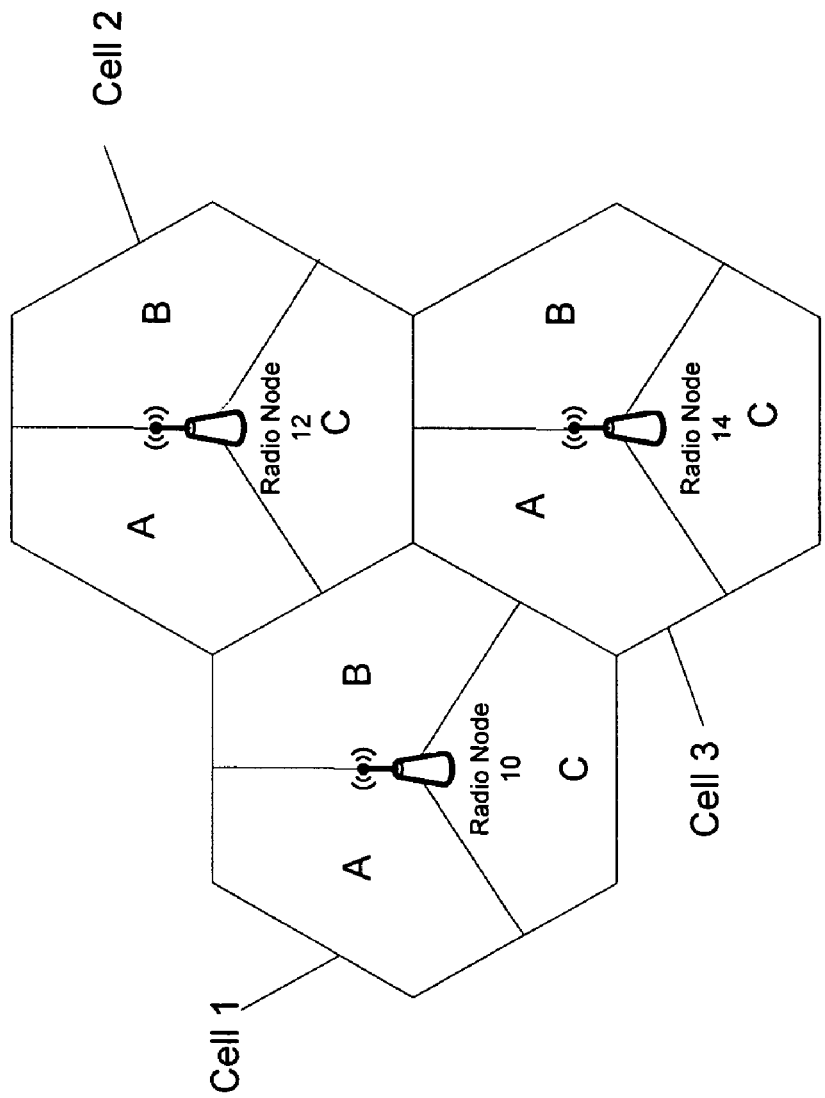
FIG. 2 is a diagram of several sectors in a radio access network.

As shown in FIG. 2, a geographic area covered by radio access network 20 (shown in FIG. 1) is divided into multiple cells 1, 2, and 3, which are each further divided into three sectors A, B, and C. Each cell includes a radio node (RN) 10, 12, 14 that communicates with access terminals (e.g., cellular telephones) (not shown) located within each RN's cell. Each radio node uses a directional antenna (not shown) appropriately positioned in each sector to send data to and receive data from ATs located in the sectors.

In practice, a radio node will often include a main receiver plus one or more identical diversity receivers. The antennae of each receiver are spaced apart from each other by a distance of several (e.g., 10) wavelengths of the RF carrier (e.g., 0.153 meters for 1900 MHz Personal Communications Service (PCS) band). This spatial diversity mitigates against RF fading and multi-path effects incurred by destructively combining RF waves due to multiple RF receive paths between the AT and the RN caused by, e.g., terrain and obstacle reflections. Generally, the more diversity receivers employed, the better the performance of the uplink signal reception.

A radio node, such as RN 10 shown in FIGS. 1-2, can generally support a certain amount of data traffic in each sector for a particular bandwidth. The amount of data traffic supported by a radio node in a sector is referred to as the pole capacity. However, pole capacity is a theoretical maximum that is limited by radio frequency (RF) interference present in the sector, which may be caused by multiple ATs transmitting in the sector, ATs from adjacent sectors, ATs from other networks, or other RF sources such as microwave ovens. Accordingly, network designers often design radio access networks to limit the data traffic in a sector to maintain usage of the sector at some percentage of pole capacity, e.g., 50% or 75% of the pole capacity, which corresponds to some rise over the baseline thermal energy of a radio node's receiver for a sector (referred to as "rise-over-thermal" or simply ROT). ROT is a time-varying function that may be represented as a dimensionless quantity by the following equation:

$$ROT(t)=[S(t)+I(t)+N(t)]/N(t)$$

where, $S(t)$ is the total signal power received over time at the radio node from all ATs in the sector, $I(t)$ is total signal power received over time at the radio node from interference sources (e.g., ATs in adjacent sectors, ATs from anther radio network, microwave ovens, etc.), and $N(t)$ is the baseline noise power of the radio node's receiver.

To ensure that a sector does not become overloaded, a radio access network can monitor the rise in thermal noise (ROT) at the radio receiver for each sector. If the ROT reaches some threshold value indicating that the sector is becoming overloaded, the radio access network will command the access terminals in the sector to reduce or freeze transmission power and/or transmission data rate. As the ROT falls below the threshold value, the network may authorize the ATs to increase power and/or transmission rate.

Figure 3:
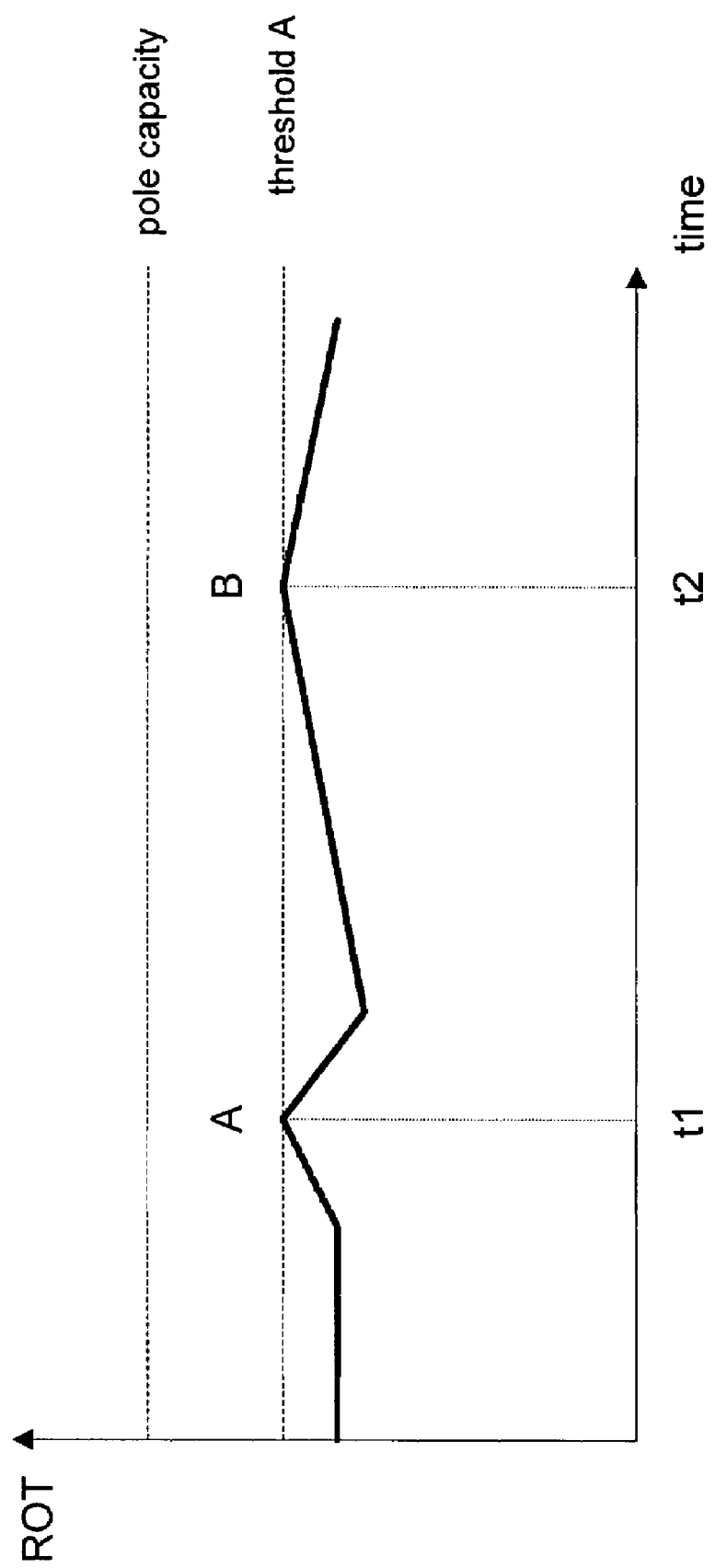
FIG. 3 is a graph charting ROT versus time in a sector of a radio access network.

For example, as shown in FIG. 3, a radio access network monitors ROT of a RN's radio receiver for a particular sector. If the ROT reaches a certain threshold A below the pole capacity of the sector (e.g., such as when the ROT reaches points A and B at times t1 and t2 respectively), the radio access network commands ATs within the sector to reduce or freeze their transmission power and/or transmission data rate. As ROT falls below the threshold, the radio may permit ATs to increase their transmission power or rate. While a single threshold is illustrated in FIG. 3, in some implementations, a radio access network may be configured to have multiple thresholds which each trigger an increasingly stringent power control algorithm.

In a 1xEV-DO-compliant network, the system can control transmission rate of ATs in a sector by setting (or clearing) the reverse activity (RA) bit in the reverse activity channel on the forward link. Thus, for example, if the ROT value is at or above threshold A shown in FIG. 3, then the radio node for the affected sector sets the RA bit. If the ROT value is below the threshold, the RA bit is cleared. When an AT receives data on an MAC channel with the RA bit set, the AT becomes aware that the sector is over-loaded and executes a "coin-flip" algorithm to determine whether to freeze or reduce its transmit rate. If the coin-flip has a first outcome, the AT freezes its transmit rate, if the coin-flip has a second outcome, the AT decreases its rate from its current rate to the next lowest rate defined by the 1xEV-DO standard. By reducing the rate at which ATs transmit on the reverse link, ATs transmit at less power and cause less interference in the sector, which decreases the ATs usage of the sector's capacity.

Because ROT affects the AT's data transmission rate (and thus also total sector throughput), it is desirable to accurately measure ROT. Indeed, the more accurate one can measure ROT, the more aggressive and robust the power-control and/or data-rate control algorithms can be implemented and the higher the overall sector throughput capacity can be achieved.

Figure 4A:
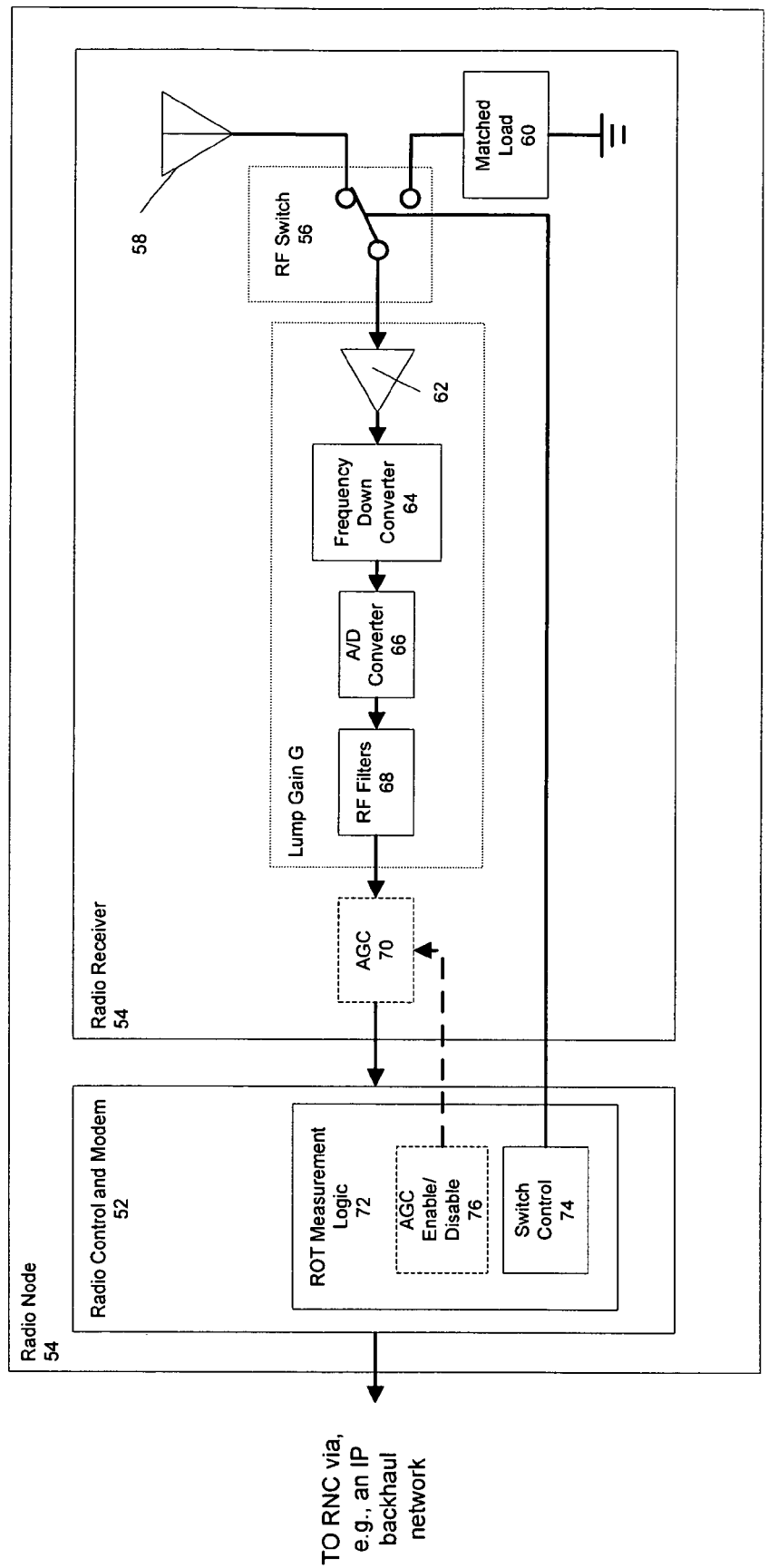
FIG. 4A is a diagram of a radio node.

Referring to FIG. 4A, a receive path of a generalized radio node 50 includes a radio control and modem component 52 and a radio receiver component 54. The radio receiver component 54 includes a low-loss RF switch 56 that alternatively connects an antenna 58 and matched load 60 to the remainder of the receiver. The load 60 is selected to have an impedance equal to that of the antenna 58, and thus is labeled as a matched load. In addition to the RF switch 56, the receiver includes amplifiers 62, a frequency downconverter 64, analog-to-digital conversion circuitry 66, and filters 68 that collectively produce a lump gain of G. In some implementations, the radio receiver also includes automatic gain control (AGC) circuitry 70 which dynamically adjusts the gain of the received signal so as to output a signal having a constant strength. Thus, a radio receiver that includes AGC circuitry will have a variable gain in its receive path.

The radio control and modem component 52 includes ROT measurement logic 72 that controls operation of the RF switch via a switch control 74. In some implementations, the ROT measurement logic also includes circuitry 76 to enable and disable the AGC circuit.

The ROT measurement logic 52 controls the RF switch 56 to connect the antenna 58 to the remainder of the receiver to receive signals transmitted by ATs in the sector. The total signal power presented to the radio controller and modem component is the thermal noise of the receiver plus the total signal power received from the ATs in the sector plus the total signal power received from interference sources, all multiplied by the gain of the receiver. This can be represented by the following equation:

$$P_{out1}(t) = [S(t) + I(t) + N(t)] * G$$

where $P_{out1}(t)$ is the total signal power received at the modem over time when RF switch is connected to the antenna, S(t) is the total signal power received over time from all mobile station users received at the antenna, I is the total power received over time from interference sources received at the antenna, N(t) is the thermal noise over time of the radio receiver component, and G is the gain of the receive path. Note that if the receiver includes AGC circuitry, e.g., AGC 70 shown in FIG. 4A, then the gain G will be a time-varying function.

While the RF switch is coupled to the antenna, the ROT measurement logic records samples of $P_{out1}$ over a particular time period. For example, as shown in FIG. 4B, the RF switch is coupled to the antenna from time t0 until time t1, when it is connected to the matched load. The ROT measurement logic samples Pout during time period T1 and, from these samples, determines an average total power received over T1, which may be designated as $P_{out1\_ave}$. The sample period T1 may the entire time when the RF switch is connected to the antenna or some fraction of the time when the antenna is connected, such as illustrated in FIG. 4B.

The ROT measurement logic 72 periodically switches the RF switch 56 to the matched load 60. The total signal power presented to the radio controller and modem component is the thermal noise power of the radio receiver component multiplied by the gain of the receiver, or:

$$P_{out2}(t) = N(t) * G$$

where $P_{out2}(t)$ is the total signal power received at the modem over time when RF switch is connected to the matched load, N(t) is the thermal noise over time of the radio receiver component, and G is the gain of the receive path. Again, if the receiver includes AGC circuitry, then the gain G will vary with time.

When the RF switch is coupled to the matched load, the ROT measurement logic records samples of $P_{out2}$. For example, as shown in FIG. 4B, the RF switch is coupled to the matched load from t1 through t2. During some portion of this time, T2, the ROT measurement logic samples $P_{out}$, and from these samples, determines an average total power received at the modem received over a time period $T_2$ while matched load is connected, or $P_{out2\_ave}$. The sampling period, T2, may be the entire duration of when the switch is coupled to the load or some fraction of it, such as what is illustrated in FIG. 4B.

As described above, the rise over thermal noise of a radio receiver (ROT) can be represented as ROT(t)=[S(t)+I(t)+N(t)]/ N(t). If the average gain of the receive path remains approximately constant for both sampling periods (e.g., period T1 and T2 shown in FIG. 4B), then ROT can be approximated by the following equation:

$$ROT(T) = P_{out1\_ave} / P_{out2\_ave},$$

where T is the time period spanned by T1 and T2 as shown in FIG. 4B.

The modem and radio controller component then use this ROT value to control transmission power and/or data rates. The ROT measurement logic preferably continually measures the ROT value, which allows the modem and radio controller component to implement an aggressive power management scheme that keeps the ATs at or near the ROT threshold, e.g., threshold A shown in FIG. 3, of the sector.

As mentioned above, using the ratio of $P_{out1\_ave}$ and $P_{out2\_ave}$ to approximate ROT is most accurate when the receiver gain can be assumed to be constant. If a radio receiver includes AGC circuitry, the AGC circuit will adjust the gain of the receiver path to keep $P_{out}$ constant. When the RF switch is coupled to the antenna, the AGC typically makes relatively small adjustments in the gain and averages $P_{out}$ over a period of time while the switch is coupled to the antenna also to average out the receiver gain. However, when the RF switch is coupled to the matched load, there is a sudden drop in $P_{out}$ and an AGC circuit will respond by significantly adjusting the gain of the receive path. Similarly, when the RF switch is reconnected to the antenna, the AGC will tend to cause $P_{out}$ to overshoot because the AGC is in a high gain state when power from the ATs and interference sources are suddenly reintroduced. One technique to negate these effects of AGC circuitry when RF switch couples the matched load is to make the switching period small compared to the time constant of the AGC response (or alternately, make the AGC time response large compared to the switching period). Thus, the AGC is not able to adjust the gain of the receive path in time to effect the measurements collected during time T2, and the average gain implicit in $P_{out2\_ave}$ can be assumed to be approximately equal to the average gain implicit in $P_{out1\_ave}$.

In some implementations, the ROT measurement logic can be configured to cause the AGC circuitry to maintain a constant gain during the time when the switch is coupled to the matched load. For example, the ROT control measurement logic can read and store the current gain of the AGC just prior to switching to the matched load, and then use the stored gain values when the switch is coupled to the matched load. If the AGC includes a digital amplifier, the gain may be stored as a digital value in memory, and if the AGC includes an analog amplifier, the gain can be stored as a voltage in a storage capacitor. The AGC circuitry is then disabled and the stored gain value(s) are used during the sampling period when the switch is coupled to the matched load (e.g., period T2 shown in FIG. 4B). Just after the sampling period, the stored AGC value(s) are written back into the AGC control points, and normal AGC operation resumes. To ensure that an anomalous gain value is not used during the switching period, a radio node may be configured to sample and average several AGC gains prior to the switch coupling the matched load.

As mentioned above, real-world radio nodes often employ multiple identical receive paths that are physically separated by a certain distance to reduce the effects of multipath fading of signals sent from an AT to the radio node. In such a case, each receive path for a sector may be adapted to have a similar configuration as what is shown in FIG. 4A. Moreover, a radio node having multiple identical receive paths can use an independently-controlled RF switch in each of the multiple receive paths, which allows the radio node to measure ROT in a way that diminishes the negative effect on sector throughput caused by decoupling a receive path from its antenna. For example, a radio node can control RF switches so that only one receive path is de-coupled from its antenna at any given time, allowing other receive paths to receive AT traffic while $P_{out2\_ave}$ is being determined on the de-coupled receive path.

Figure 5:
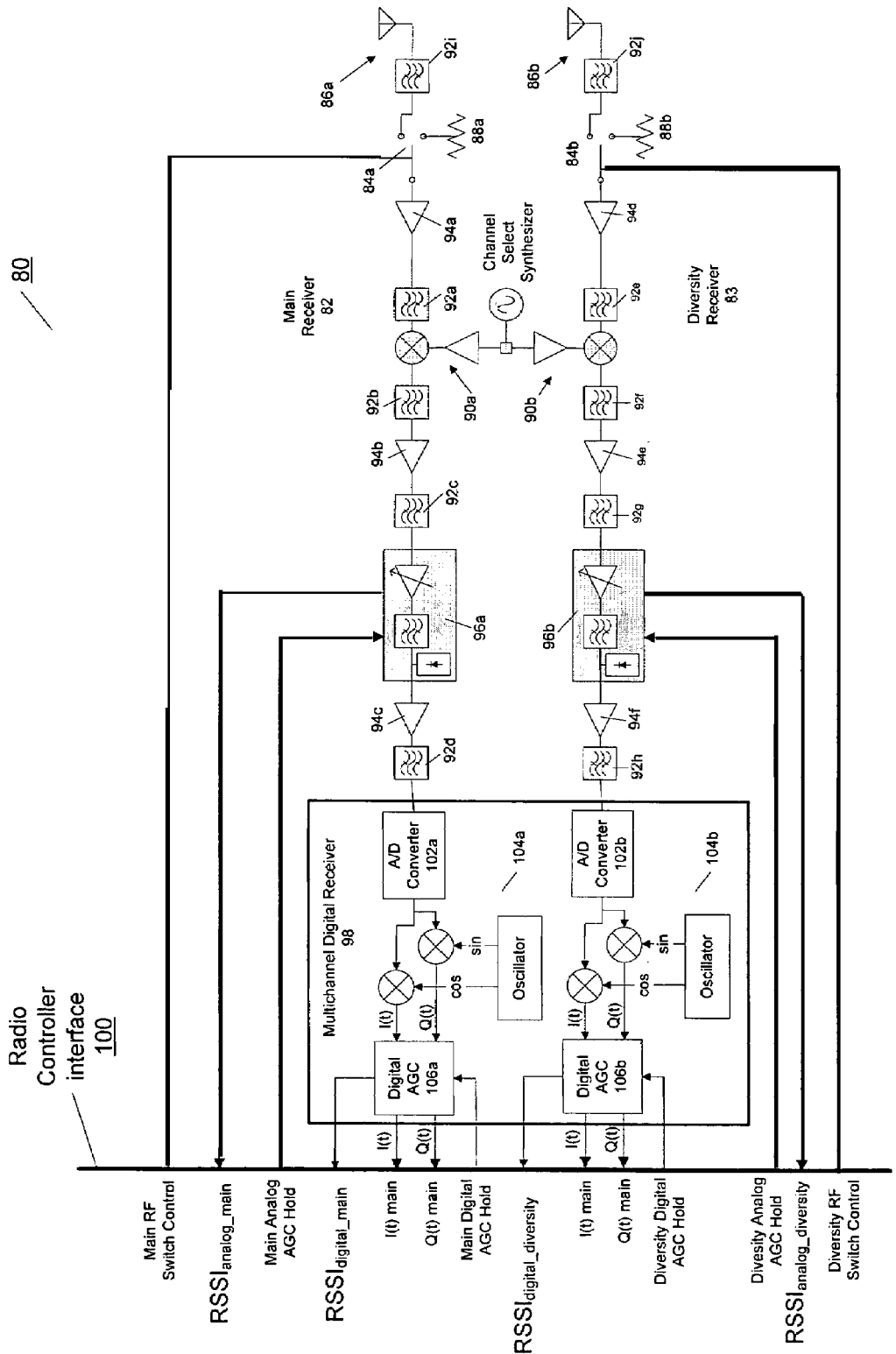
FIG. 5 is a diagram of a radio receiver.

Referring to FIG. 5, a detailed view of the components in a receive path (i.e., reverse link) of a CDMA radio receiver 80 for a sector are shown. In the illustrated example, the receiver 80 includes a main receive path 82 and a diversity receive path receive path 83. Both the main and diversity receive path includes an RF switch 84a, 84b that selectively couples an antenna 86a, 86b or a matched RF load 88a, 88b to the remainder of the receiver. In addition, each receive path includes down frequency conversion circuitry 90a, 90b, filters 92a-92j, amplifiers 94a-94f, and analog automatic gain control circuitry 96a, 96b. The analog portion of each receive path includes a lump fixed gain component, $G_{fixed}$, and a variable gain component, $G_{var\_analog}$, due to the analog gain control circuitry 96a, 96b.

The main and diversity receive paths input to a multi-channel digital receiver 98, which includes, for each channel, an analog-to-digital converter 102a, 102b, digital frequency down-converter 104a, 104b and an digital automatic gain control circuit 106a, 106b. The digital receiver 98 receives the analog input from the main and diversity channels and converts the analog received signals to a digital signal using the A/D converters 102a, 102b. The digital signal from the main and diversity channels are then fed into the digital frequency down-converters 104a, 104b that produce an in-phase (I(t)) and quadrature (Q(t)) voltage signal for each channel. The in-phase and quadrature voltage signals are then fed into the digital AGC circuits 106a, 106b, which adjusts the gain, $G_{var\_digital}$, applied to the signals to output in-phase and quadrature signals that have a relatively constant power. $P_{out}(t)$ is proportional to the sum of the in-phase and quadrature signals, I(t) and Q(t), as follows:

$$P_{out}(t)=[I^2(t)+Q^2(t)]/2R,$$

where R is the characteristic impedance for a receive path, typically 50 ohms.

The analog and digital AGC circuits 96a, 96b, 106a, 106b each output a Receive Signal Strength Indicator (RSSI) signal, which indicates the signal strength of the signal received at the input signal of the AGC. The AGC circuits are configured to adjust the gain proportional to the inverse of RSSI, or:

$$G_{var\_analog}(t)=K_{analog}/RSSI_{analog}(t); \text{ and}$$

$$G_{var\_digital}(t)=K_{digital}/RSSI_{digital}(t),$$

where $RSSI_{analog}(t)$ is a time-varying RSSI signal of an analog AGC in the receive path, $K_{analog}$ is a predetermined circuit-specific constant that relates gain to RSSI for the analog AGC, $RSSI_{digital}(t)$ is a time-varying RSSI signal of a digital AGC in the receive path, and $K_{digital}$ is a predetermined circuit-specific constant that relates gain to RSSI for the digital AGC.

The radio controller interface 100 receives the RSSI signal for each of the AGC circuits, i.e., $RSSI_{analog\_main}$, $RSSI_{digital\_main}$, $RSSI_{analog\_diversity}$, $RSSI_{digital\_diversity}$. The radio controller interface 100 outputs four signals, Main Analog AGC Hold, Main Digital AGC Hold, Diversity Analog AGC Hold, and Diversity Digital AGC Hold, to hold the gain of each of the AGC circuits constant as well as two switch control signals to control the RF switch 84a, 84b in each receive path. The radio controller is configured to independently control RF switches 84a and 84b as well as the AGC hold signals. This permits a radio controller to measure ROT on one receive path (e.g., the main receive path) while the other receive path (e.g., the diversity receive path) receives AT traffic as normal. By independently controlling the receive paths so that only one receive path is connected to the matched load at any given time, a radio controller can reduce negative effects on the receive uplink signal performance during the ROT measurement.

In some implementations, a radio controller (not shown) can be configured to measure ROT by taking the ratio of $P_{out}$ (i.e., $[I^2(t)+Q^2(t)]/2R$) measured when the switch is coupled to the antenna versus $P_{out}$ measured when the switch is coupled to the matched load. To ensure an accurate ROT measurement, the radio controller preferably ensures that the gain of the AGCs in the measured receive path is maintained as approximately constant while the switch is coupled to the matched load. A radio controller may be configured to maintain constant gain by limiting the time during which the switch is coupled to the load to less than the response time of either AGC circuit. Thus a digital AGC circuit has a response time of τ1 and an analog AGC circuit in the same receive path has a response time of τ2 where τ1<τ2, a radio controller may be configured to control the RF switch such that the time when the switch is coupled to the load (τ3) is less than τ1 (e.g., τ3<<τ1).

A radio controller may also be configured to maintain constant gain by sending to the AGCs in the receive path on which ROT is being measured a signal that causes the AGC to maintain a constant gain while the switch is coupled to the matched load.

Figure 6A:
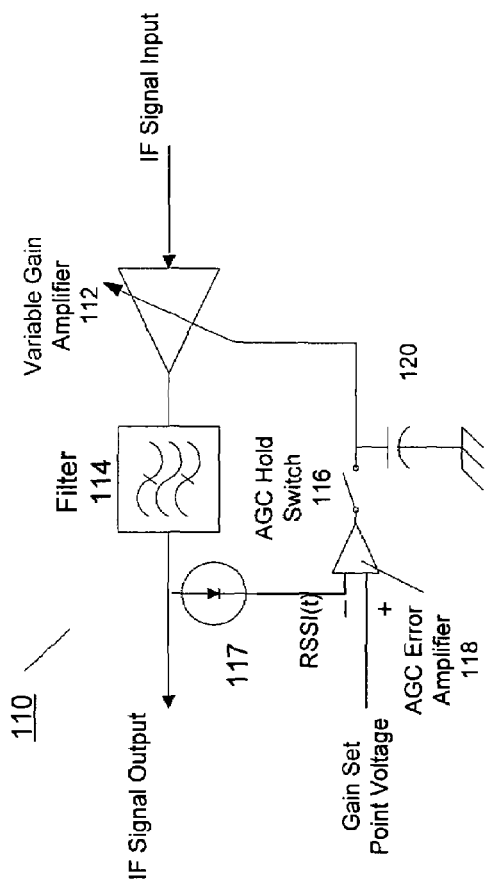
FIGS. 6A-6B are diagrams of automatic gain control circuits.

For example, as shown in FIG. 6A, an analog automatic gain control (AGC) circuit 110 passes an input signal through a variable gain amplifier 112 and filter 114. The AGC 110 includes a feedback loop having an RF detector diode 117, AGC error amplifier 118, and a hold switch 116. A capacitor, which functions as an AGC loop filter 120, is connected between the feedback loop and ground. When the AGC switch is closed (i.e., able to conduct channel current), the output of the RF detector diode is compared with a set point voltage at the input of the AGC error amplifier. The AGC error amplifier measures the difference between the gain set point and the RF detector diode voltage and produces an error voltage. The error voltage is fed back to the variable gain amplifier 112, which adjusts the gain to maintain a constant output voltage and power. The voltage across the loop filter capacitor 120 tracks the error voltage output from the AGC error amplifier. When the AGC switch is opened (i.e., not able to conduct channel current), the feedback loop is disabled and the control voltage to the variable gain amplifier is held constant to the value stored on the loop filter capacitor 120, causing the gain of the variable gain amplifier to remain constant.

Figure 6B:
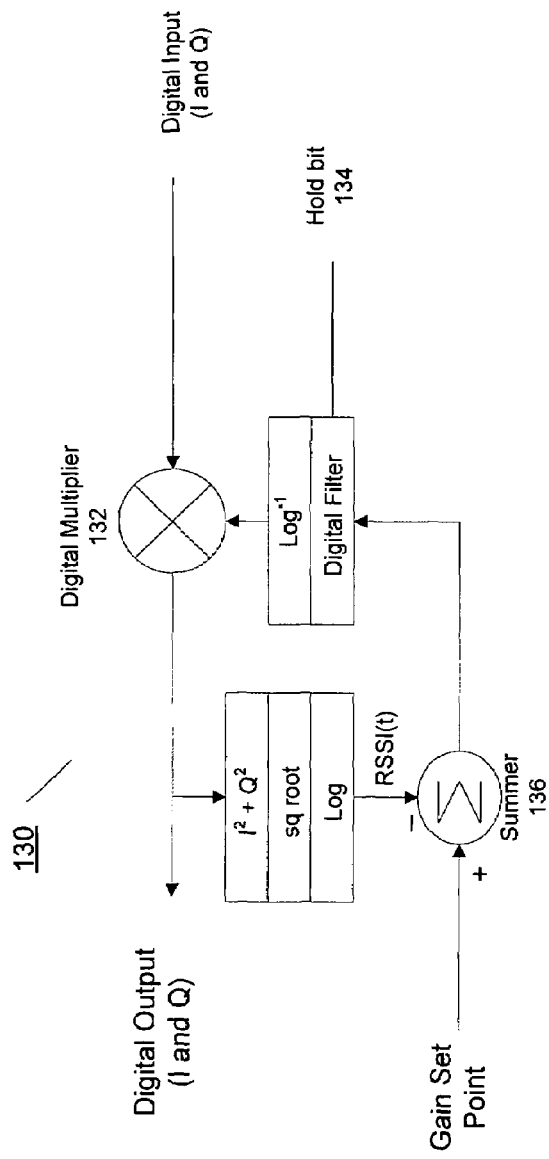

Similarly, as shown in FIG. 6B, a digital automatic gain control (AGC) circuit 130 includes a digital multiplier 132 that multiples an incoming digital signal (i.e., I(t)+Q(t)) with the output of a feedback loop. The feedback loop continually computes the difference between RSSI(t) and a predetermined gain set point. The resulting difference is stored in a digital filter register and the inverse log of the stored filter value is multiplied with the incoming digital signal to maintain the power of the incoming digital signal at a constant level. The digital filter register receives a hold bit 134 (e.g., from a radio controller) that locks the stored value in the register and prevents new values from overwriting the stored value. This keeps the gain of the digital AGC circuit 130 constant, for example, during a period when the RF switch 84a (shown in FIG. 5) is coupled to the matched load. The hold bit 134 may be cleared, allowing the digital filter register to be overwritten with new gain values.

In some implementations, a radio controller measures gain as part of estimating ROT. For example, a radio controller may measure the variable gain of the AGC circuits in a receive path to determine a ratio of $P_{in}$ (i.e., power received at the RF switch) when the switch is coupled to the antenna versus $P_{in}$ when the switch is coupled to the matched load. Pin may be determined by dividing Pout by the gain of the receive path, or:

$$P_{in}=P_{out}/[G_{fix}*G_{var\_analog}*G_{var\_digital}],$$

where $G_{fix}$ is the fixed gain of a receive path, $G_{var\_analog}$ is variable gain due to an analog AGC, and $G_{var\_digital}$ is variable gain due to a digital AGC. As described above, Pout can be determined from the equation Pout(t)=$[I^2(t)+Q^2(t)]/2R$, where R is the impedance for the receive path. The fixed gain, $G_{fix}$, is a fixed quantity that is predetermined, and the variable gain components, $G_{var\_analog}$ and $G_{var\_digital}$, are equal to the inverse of the RSSI signal output by the respective AGC circuits (i.e., $G_{var\_analog}=K_{analog}/RSSI_{analog}$, $G_{var\_digital}=K_{digital}/RSSI_{digital}$). Rather than measuring power, e.g., Pin, in watts, it is often more practical to measure power in decibel-watts (dBW). In this case, a radio receiver can measure $P_{in}$ using either of the following equations:

$$10\log[P_{in}(t)]=10\log[P_{out}(t)]-10\log[G_{fix}]-10\log[G_{analog}(t)]-10\log[G_{digital}(t)], \text{ or}$$

$$10\log[P_{in}(t)]=10\log[\{I^2(t)+Q^2(t)\}/2R]-10\log[G_{fix}]-10\log[K_{analog}/RSSI_{analog}(t)]-10\log[K_{digital}/RSSI_{digital}(t)].$$

A radio controller may take several measurements of 10log [Pout(t)], $10\log[G_{analog}(t)]$, and $10\log[G_{digital}(t)]$ when the switch is coupled to the antenna to obtain an average value for $10\log[P_{in\_1}(T1)]$, where T1 is the sampling period. Similarly, the controller may take several measurements of $10\log[P_{out}(t)]$, $10\log[G_{analog}(t)]$, and $10\log[G_{digital}(t)]$ when the switch is coupled to the matched load to obtain an average value for $10\log[P_{in\_2}(T2)]$, where T2 is the sampling period. ROT may be estimated by taking the ratio of the two $P_{in}$ measurements, or $10\log[ROT(T1+T2)]$ (in dBW)=$10\log[P_{in\_1}(Ti)]-10\log[P_{in\_2}(T2)]$.

A current draft revision to the 1xEV-DO standard proposes mechanisms whereby a radio node can instruct all ATs in a sector to synchronously enter a "quiet" period, in which the ATs in the sector cease transmission for a certain period of time. During this quiet period, the radio node can measure the total power output by the radio receiver, i.e., $P_{out}$, during the quiet period to determine baseline thermal noise of the receiver. A ROT estimate may then be obtained by measuring $P_{out}$ during a non-quiet period when the ATs in the sector are transmitting data. Because ATs may be distributed over a large geographic area in a sector, the quiet period needs to be long enough to ensure that a signal transmitted by an AT at the edge of the sector is received at the RN receiver before the RN receiver begins to measure thermal noise. Since the ATs cease all data traffic during the quiet period, overall sector throughput capacity is reduced.

Using an RF switch and matched load to estimate ROT, such as shown in FIGS. 4A and 5, eliminates the need for ATs in a sector to stop transmission. While the radio node does not receive any data from the ATs when the RF switch is coupled to the matched load, the switched period may be made shorter than a required quiet period, and, as a result, achieve better overall sector throughput.

Note that during a quiet period, the radio receiver still receives RF energy from interference sources, such as ATs in adjacent sectors, ATs associated with another network, microwave ovens, etc. Thus, an RF switch and matched load can be used in conjunction with a quiet period to isolate the receiver from RF energy transmitted from interference sources. For example, an RF switch may be controlled to couple a matched load during all or some fraction of the quiet period. The radio node controller may then sample Pout while the switch is coupled to the load to obtain an average value for the baseline thermal noise component of the receiver. Additionally, a radio controller may sample Pout during the quiet period when the switch is coupled to the matched load as well as when the switch is coupled to the antenna to isolate an average value of I and S in the ROT equation, ROT(t)=[S(t)+ I(t)+N(t)]/N(t). In particular $I_{ave}$ and $S_{ave}$ can be determined by the following set of equations:

$$P_{out1\_ave}=[S_{ave}+I_{ave}+N_{ave}]*G,$$

$$P_{out2\_ave}=[I_{ave}+N_{ave}]*G,$$

$$P_{out3\_ave}=N_{ave}*G,$$

$$S_{ave}=P_{out1\_ave}-P_{out2\_ave}, \text{ and}$$

$$I_{ave}=P_{out2\_ave}-P_{out3\_ave},$$

where $P_{out1\_ave}$ is an average value of $P_{out}$ during a non-quiet period with the RF switch coupled to the antenna, $P_{out2\_ave}$ is an average value of $P_{out}$ during a quiet period with the switch coupled to the antenna, and $P_{out3\_ave}$ is an average value of $P_{out}$ during a quiet period with the switch coupled to the matched load.

A number of embodiments of the invention have been described. Nevertheless, it will be understood that various modifications may be made without departing from the spirit and scope of the invention, and, accordingly, other embodiments are within the scope of the following claims.

The invention claimed is:

1. A method comprising:
   determining a first measurement of a first signal power in a radio receiver configured to receive data traffic in a sector of a radio access network when the radio receiver is receiving energy from an antenna that is receiving the data traffic;
   determining a second measurement of a second signal power in the radio receiver when the radio receiver is not receiving energy from the antenna;
   determining a load in the sector based on comparing the first and second measurements, and
   dynamically adjusting a gain of the radio receiver using variable gain circuitry, the first radio receiver comprising the variable gain circuitry.

2. The method of claim 1 wherein determining the first measurement of the first signal power comprises:
   determining a first measurement of an output signal power, the output signal power being output by the radio receiver.

3. The method of claim 1 wherein determining the first measurement of the first signal power comprises:
   determining a first measurement of an input signal power at an input of the radio receiver.

4. The method of claim 3, further comprising:
   determining a first measurement of an output signal power, the output signal power being output by the radio receiver;
   determining a first measurement of the gain of the radio receiver; and
   wherein determining the first measurement of the input signal power at the input of the radio receiver comprises:
      deriving the first measurement of the input signal power from the first measurement of the output signal power and the first measurement of the gain of the radio receiver.

5. The method of claim 1 wherein determining the first measurement of the first signal power comprises:
   obtaining an average signal power over a time period T1 when the radio receiver is receiving energy from the antenna.

6. The method of claim 5 wherein determining the second measurement of the second signal power comprises:
   obtaining a second average signal power over a time period T2 when the radio receiver is not receiving energy from the antenna.

7. The method of claim 1 wherein determining the load comprises:
   determining the load based on a ratio of the first measurement to the second measurement.

8. The method of claim 1 further comprising:
   decoupling the antenna from the radio receiver using a switch.

9. The method of claim 8 further comprising:
   using the switch to couple a resistive load having an impedance equivalent to that of the antenna.

10. The method of claim 9 wherein determination of the second measurement occurs when the switch is coupled to the resistive load.

11. The method of claim 8 further comprising:
    controlling the switch to keep a time period during which the antenna is de-coupled from the radio receiver at less than a response time of the variable gain circuitry.

12. The method of claim 1 further comprising:
    controlling transmission of data by access terminals in the sector based on the load.

13. The method of claim 12 wherein controlling transmission of the data comprises:
    controlling a rate at which the data are transmitted by the access terminals in the sector.

14. The method of claim 1 wherein the radio access network is a code division multiple access network.

15. The method of claim 1 wherein the radio access network is a first evolution data-only network.

16. The method of claim 1 further comprising:
    causing access terminals within the sector to cease transmission for a time period.

17. The method of claim 16 wherein determining the second measurement of signal power occurs when the radio receiver is not receiving energy from the antenna and when the access terminals within the sector have ceased transmission.

18. The method of claim 17 further comprising:
    determining a third measurement of a third signal power in the radio receiver when the radio receiver is receiving energy from the antenna and when the access terminals within the sector have ceased transmission.

19. The method of claim 18 further comprising:
    determining a level of interference within the sector based on at least the second and third measurements.

20. The method of claim 18 further comprising:
    determining a level of signal power received from access terminals in the sector based on at least the first and third measurements.

21. The method of claim 1 further comprising:
    attempting to maintain the gain of the receiver at a constant level during a time when the second measurement is determined.

22. The method of claim 21 wherein determination of the second measurement occurs over a time period that is less than a response time of the variable gain circuitry.

23. A method of monitoring a load in a sector of a radio access network, the radio access network comprising a radio node, the radio node comprising multiple receivers and corresponding respective multiple antennas configured to receive data traffic in the sector, the method comprising:
    de-coupling a first receiver of the multiple receivers from a first antenna of the corresponding respective multiple antennas;
    maintaining at least one other receiver of the multiple receivers coupled to at least one other corresponding respective antenna of the corresponding respective multiple antennas while the first receiver is de-coupled from the first antenna;
    determining a first measurement of a first signal power in the first receiver when the first receiver is de-coupled from the first antenna; and
    determining a second measurement of a second signal power in a receiver of the multiple receivers when the receiver is coupled to its corresponding respective antenna; and
    determining the load in the sector based on comparing the first and second measurements.

24. The method of claim 23 wherein maintaining the at least one other receiver coupled to the at least one other corresponding respective antenna comprises:

ensuring that only one receiver of the multiple receivers is de-coupled from its corresponding respective antenna at any one time.

25. The method of claim 23 wherein the first receiver comprises the receiver for which the measurement of the second signal power is determined and wherein its corresponding respective antenna comprises the first antenna.

26. The method of claim 23 wherein de-coupling the first receiver comprises:
controlling a switch to de-couple the first receiver from the first antenna and to couple the first receiver to a load having an impedance equivalent to that of the first antenna.

27. The method of claim 26 further comprising:
dynamically adjusting a gain of the first receiver using variable gain circuitry, the first receiver comprising the variable gain circuitry; and
wherein de-coupling the first receiver further comprises:
controlling the switch to keep a time period during which the first antenna is de-coupled from the first receiver at less than a response time of the variable gain circuitry.

28. The method of claim 23 wherein determining the measurement of the first signal power comprises:
obtaining an average signal power over a time period when the first receiver is de-coupled from the first antenna.

29. The method of claim 23 wherein determining the measurement of the first signal power comprises:
determining a measurement of an output signal power, the output signal power being output by the first receiver.

30. The method of claim 23 wherein determining the measurement of the first signal power comprises:
determining a measurement of an input signal power at an input of the first receiver.

31. The method of claim 23 further comprising:
dynamically adjusting a gain of the first receiver using variable gain circuitry, the first receiver comprising the variable gain circuitry; and
attempting to maintain the gain of the receiver at a constant level during a time when the measurement of the first signal power is determined.

* * * * *